UNITED STATES PATENT OFFICE.

ROBERT MÜLLER, OF MUNICH, GERMANY.

INSULATING MATERIAL AND METHOD OF MANUFACTURING SAME.

No. 869,321.        Specification of Letters Patent.        Patented Oct. 29, 1907.

Application filed January 6, 1905. Serial No. 239,955. (Specimens.)

*To all whom it may concern:*

Be it known that I, ROBERT MÜLLER, a citizen of Germany, residing at Munich, Bavaria, Germany; have invented certain new and useful Improvements in Fireproof Insulating Material and Methods of Manufacturing the Same; and I do hereby declare the following to be a full, clear, and exact description of the invention, such as will enable others skilled in the art to which it appertains to make and use the same.

This invention relates to a new fire-proof insulating material and to the method of making the same.

My new material is peculiarly adapted for use as a fire-proof, electrical insulator.

Many attempts have hitherto been made to produce, for electrical purposes, an insulating material which would meet all the requirements of the art, but prior to my invention, no electrical insulating material has been found, so far as I am aware, which is satisfactory in all respects.

The best insulating material, so far as specific resistance at normal temperatures is concerned, is rubber, but unfortunately this is affected seriously by heat so that at temperatures to which it may be subjected in actual practice, it becomes useless. In addition to this, the cost of rubber is so great as to render its use commercially impractical in many places where it otherwise may be used. Porcelain is another example of an insulating material which has a high specific resistance. It will withstand a high degree of heat without injury to its resisting properties but, on the other hand, it also has serious drawbacks. For example, it is readily broken, cannot be turned, bored or drilled or otherwise worked with tools, and if hard burned, as is necessary to produce the better class of insulation, it is relatively expensive. Moreover, its interior is very porous so that if the exterior enamel becomes scratched or cracked, the porcelain becomes hygroscopic to a disadvantageous extent. Wood, if dry, is also an insulator of relatively good specific resistance and has the great advantage that it is readily worked with tools, but it is very hygroscopic and burns easily.

By my invention, I provide a fire-proof electrical insulating material which has a high specific resistance sufficiently near to that of rubber or porcelain to make it satisfactory in the electrical art. It will withstand as high a degree of heat as it will be subjected to in practice without loss of its insulating properties, whereby it may be used in place of porcelain and it may be worked with tools practically as easily as wood. It takes a screw-thread very satisfactorily. Moreover, it may be also molded into shape in the same manner as rubber or porcelain and does not require the use of heat in its manufacture. It does not shrink as porcelain does in molds and costs very much less than hard rubber or porcelain to produce.

The invention will now be described in its preferred embodiment when such embodiment is a solid.

In carrying out my invention, for making solid, fireproof, electrical insulating material, I combine a fire-resistant material, for example, asbestos, preferably in a comminuted state, by means of a binder consisting of a bituminous material whose fusing point is substantially as high as that of mineral pitch,—that is, relatively high for a binding material of this kind, dissolved in a suitable volatile solvent (such as benzol or other volatile hydrocarbon, for example) of such bituminous material; the proportions of the binder and fire-resisting material being such that a consistent plastic mass is formed which is then subjected to heavy pressure, preferably in a cold state, and dried by the evaporation of the solvent whereby a solid fire-proof and hard insulating material is obtained, having all the desirable properties required in the art.

In order to distribute the pitch uniformly between the asbestos fibers or particles and to entangle the latter at the same time, the asbestos is intimately mingled with the volatile pitch solution and then heavily compressed preferably in a cool state and dried by evaporation as stated. In the solid material thus produced, the firm consistency of pitch after compression and evaporation of the volatile solvent makes the asbestos fibers non-hygroscopic and the solid product is in fact so non-inflammable that it may be subjected temporarily to an electric arc without being burned up and without being softened.

In view of the fact that the bituminous material, such for example, as mineral pitch will burn at a relatively low temperature whereas when combined, as in my invention, the product is practically fire-proof, it is probable that this paradoxical action is due to the fact that in the completed material produced by my invention, asbestos is the chief fire resistant material, while the pitch seems merely to impregnate and coat the particles of asbestos and to cement them together, the amount of pitch being so minimized that the pitch in the completed material constitutes a substantially non-inflammable factor. It is possible that the ability of the pitch to resist high temperatures to which the material may be subjected without softening or igniting, is due to the fact that the relatively thin layers of the binding material are protected by the asbestos from access of oxygen. When the particles or fibers of the fire-resisting material are cemented together by the binder, and the mass is subjected to heavy pressure for condensing or initially hardening it, the pitch remaining in the compressed mass is minimized in quantity and is present in what may be designated as approximately filmiform layers or coatings and although made from a material which in ordinary relations is easily inflammable are, nevertheless, practically non-inflammable and practically non-softing as is proven by subjection of samples to the electric arc. Herein lies a reconcilement of antagonisms, the theory of which I do not pretend to precisely understand but which I have hereinbefore set forth according to the best of my present understanding. By the gradual evaporation of the solvent (I recommend a volatile hydrocarbon, especially benzol, for use as a solvent), my new solid product is given a peculiar character which, although the product is refractory and hard, permits the product to be worked readily with tools and in molds without anything more than ordinary wear and tear.

In my process of making insulating material, I preferably prepare a binder consisting of 100 parts of the bituminous material, such as mineral pitch, dissolved at about normal temperature in approximately 20 parts by weight of a volatile solvent, such as benzol, or the like. This solution is mixed, preferably without the application of heat, with a preferably comminuted natural asbestos in the proportion of 20 to 75 parts of the solution to 100 parts of the fire-resisting material to form a consistent plastic mass, which may be molded or otherwise compressed into the desired shape. The consistency of the mass will depend upon the proportions of the ingredients within the limits mentioned and may be varied according to the properties desired in the product.

Instead of using asbestos only, I may mix with it a suitable heat, water and fire-proof filler, such, for example, as quartz or kaolin; for example, 100 parts of the asbestos may be mixed with from one to 100 parts by weight of the filler which is preferably a finely pulverized, inorganic body. This mixture of the asbestos with the finely pulverized, inorganic heat, water and fire-proof filler is then combined with the binder in the same manner and in substantially the same proportions as hereinbefore described.

The volatile ingredient of the compressed product is permitted to evaporate therefrom by exposure to air whereupon the product is hardened by the evaporation of the solvent. If desired, the compressed mass may be subjected to heat for the purpose of hastening the evaporation.

The resultant product has a high degree of hardness, may be worked with facility by means of tools, takes a high polish, possesses extraordinary power of resistance to many acids and alkalies, is not hygroscopic and its resistance to heat and to the electrical current is very high. For example, it has been shown that a sample of my new product having an average thickness of 10.95 millimeters had an insulation resistance of more than five million megohms; and that when the sample of my new product was placed in an arc, a black smoke was emitted. The samples became red hot and burned with a yellow flame which continued for a second or two after the sample had been removed. After exposure to the arc, the sample had a steel blue appearance. It was consumed very slowly, three minutes exposure slightly rounding the edges. It did not soften. By reason of these various properties, my new product is admirably adapted for employment as an electrical insulating material. Moreover, owing to the low cost of the materials employed in its manufacture and the relatively simple process required to produce it the insulating devices in any desired form may be made at such a low price as to render the material capable of general use in the arts.

My new material may be used for other purposes than electrical insulation but that use is its peculiar and most striking field. If it is desired, the unpressed plastic mass above described may be used as a fire-proof non-conductor in many situations where it may be allowed to harden *in situ*.

When the composition is compressed the voids or spaces occurring between the asbestos fibers or particles are substantially filled up, although it is probable that the evaporation of the solvent effects a certain degree of porosity in the compacted mass, the possible porosity enhancing the insulating capacity of the mass, while its exterior skin is more hardly condensed.

Having thus fully described the principle of my invention and the best mode now known to me of applying the same, what I claim as new and desire to secure by Letters Patent of the United States, is:

1. An insulating composition comprising a fragmentary mineral fire-proof material united by filmiform layers of a pitchy substance having a relatively high fusing point.

2. An insulating material consisting of a hardened mass comprising fragments of fire resistant material cemented together by a bituminous material having a relatively high fusing point, the bituminous material being only sufficient in quantity to fill substantially the voids whereby the resistant properties of the fire-resistant material are made effective.

3. An insulating material comprising a hardened mass comprising asbestos fragments cemented together by a pitch having a relatively high fusing point, the pitch being only sufficient in quantity to fill substantially the voids whereby the resistant properties of the asbestos are made effective.

4. An insulating material consisting of a hardened mass of intimately mingled comminuted asbestos, and an inorganic heat, water and fire-proof filler cemented together by a bituminous binding material having a relatively high fusing point, the binding material being only sufficient in quantity to fill substantially the voids whereby the resistant properties of the asbestos and the inorganic filler are made effective.

5. A non-hygroscopic, fire-proof, electrical insulating composition comprising asbestos mixed with a solution of pitch and evaporatable pitch solvent, the pitch serving in the composition, after evaporation of the solvent, as a substantially fire-proof binder and also as a non-hygroscopic coating for the asbestos, the pitch also serving to fill the voids.

6. A compressed, non-hygroscopic, fire-proof, electrical insulating composition comprising asbestos, compressed with a solution of mineral pitch and volatile hydrocarbon, the pitch serving in the compressed composition, after evaporation of the solvent, as a substantially fire-proof binder and also as a non-hygroscopic coating for the asbestos, the pitch also serving to fill the voids.

7. A compressed non-hygroscopic, fire-proof, electrical, insulating composition comprising asbestos compressed with an evaporatable solution of mineral pitch which serves in the compressed composition, after evaporation of the volatile constituent of said solution, as a substantially fire-proof binder and also as a non-hygroscopic coating for the asbestos, the pitch also serving to fill the voids.

8. A compressed non-hygroscopic, fire-proof electrical, insulating composition comprising asbestos with an evaporatable solution of bituminous material which serves in the compressed composition, after evaporation of the evaporatable constituent of said solution, as a substantially fire-proof binder and also as a non-hygroscopic coating for the asbestos, the bituminous material also serving to fill the voids.

9. A compressed non-hygroscopic, fire-proof, electrical insulating composition comprising asbestos and a fire-proof filler mixed together and mixed with an evaporatable solution of bituminous material serving in the compressed composition, after evaporation of the evaporatable constituent of the solution, as a substantially fire-proof binder for the asbestos and filler and also as a non-hygroscopic coating for the asbestos, the bituminous material also serving to fill the voids.

10. The method of manufacturing insulating material which consists in dissolving a bituminous binding material having a relatively high fusing point in a volatile solvent for such material, then incorporating therewith a fragmentary fire-resisting material in such proportions that in the completed product the binding material will only be sufficient in quantity to fill completely the voids, then pressing said mass into shape and drying it.

11. The method of manufacturing insulating material which consists in dissolving a pitch having a relatively high fusing point in a pitch solvent, incorporating therewith a fire-resistant filler in such proportions that in the completed product the binding material will only be sufficient to fill completely the voids, then molding said mass into shape and drying it.

12. The method of manufacturing insulating material which consists in dissolving mineral pitch in a pitch solvent, combining therewith comminuted asbestos in such proportions that in the completed product the pitch will only be sufficient to fill completely the voids, then molding the material into shape and drying it.

13. The method of manufacturing insulating material which consists in dissolving mineral pitch in benzol, combining therewith comminuted asbestos in such proportions that in the completed product the pitch will only be sufficient to fill completely the voids, then pressing the mass into shape and removing the solvent.

14. The method of manufacturing insulating material which consists in mixing with asbestos a fire, water and acid proof filler, adding a binder consisting of bituminous material dissolved at normal temperature in a volatile solvent, in such proportions than in the completed product the binding material will be only sufficient in quantity to fill completely the voids, whereby the resistant properties of the asbestos and the filler are made effective, then pressing the mass into shape and drying it.

15. The method of making a solid, non-hygroscopic, electrical, insulating composition, consisting in mixing an inorganic fire-proof filler with asbestos and a solution of mineral pitch and volatile hydrocarbon; then compressing the mixture into the desired form and filling the voids, and then hardening the compressed mass by evaporation of the volatile hydrocarbon.

16. The method of making non-hygroscopic, electrical, insulating material consisting in mixing asbestos with a solution of pitch and pitch solvent; and then compressing the mixture into desired form and filling the voids, and then hardening the compressed mass by evaporation of the volatile hydrocarbon.

In testimony whereof I hereunto affix my signature in the presence of two witnesses.

ROBERT MÜLLER.

Witnesses:
ABRAHAM SCHLESINGER,
MATHILDE HELD.